Fig. 1.

Dec. 10, 1968 A. RUTENBERG 3,416,075
FIXED QUANTITY APPARATUS FOR METERING THE CONSUMPTION
BY A CONSUMER OF ELECTRICITY OR THE LIKE SUPPLIED
OVER A COMMON SUPPLY NETWORK AND FOR PROCESSING
THE DATA REPRESENTING SUCH CONSUMPTION
Filed March 17, 1965 6 Sheets-Sheet 2

INVENTOR
ABRAHAM RUTENBERG
BY
Morgan, Finnegan, Durham & Pine
ATTORNEY

Dec. 10, 1968  A. RUTENBERG  3,416,075
FIXED QUANTITY APPARATUS FOR METERING THE CONSUMPTION
BY A CONSUMER OF ELECTRICITY OR THE LIKE SUPPLIED
OVER A COMMON SUPPLY NETWORK AND FOR PROCESSING
THE DATA REPRESENTING SUCH CONSUMPTION
Filed March 17, 1965  6 Sheets-Sheet 3

INVENTOR
ABRAHAM RUTENBERG
BY
Morgan, Finnegan, Durham & Pine
ATTORNEY

Dec. 10, 1968   A. RUTENBERG   3,416,075
FIXED QUANTITY APPARATUS FOR METERING THE CONSUMPTION
BY A CONSUMER OF ELECTRICITY OR THE LIKE SUPPLIED
OVER A COMMON SUPPLY NETWORK AND FOR PROCESSING
THE DATA REPRESENTING SUCH CONSUMPTION
Filed March 17, 1965   6 Sheets-Sheet 4

INVENTOR
ABRAHAM RUTENBERG
BY
Morgan, Finnegan, Durham & Pine
ATTORNEY

Fig. 9.

United States Patent Office 3,416,075
Patented Dec. 10, 1968

3,416,075
FIXED QUANTITY APPARATUS FOR METERING THE CONSUMPTION BY A CONSUMER OF ELECTRICITY OR THE LIKE SUPPLIED OVER A COMMON SUPPLY NETWORK AND FOR PROCESSING THE DATA REPRESENTING SUCH CONSUMPTION
Abraham Rutenberg, Haifa, Israel, assignor to Electrometre, S.A., Zug, Switzerland, a corporation of Switzerland
Continuation-in-part of application Ser. No. 8,398, Feb. 12, 1960. This application Mar. 17, 1965, Ser. No. 440,419
Claims priority, application Great Britain, Mar. 11, 1959, 8,434/59; May 28, 1959, 18,255/59
22 Claims. (Cl. 324—157)

ABSTRACT OF THE DISCLOSURE

A system and process for metering commodity consumption of electric power and like commodities and for billing for such consumption, wherein the billing is based upon issuance of a fixed-sum bill each time a predetermined quantity of the commodity is consumed. The customer bill can be issued either locally or by transmitting signals to a remote central point from which the bill is issued.

---

This application relates to the metering of and accounting for the consumption of a commodity, such as electricity, gas or a liquid such as water, by an individual consumer connected in parallel with a number of other consumers to a common supply network and is a continuation-in-part of my co-pending application Ser. No. 8,398, filed Feb. 12, 1960, now abandoned, entitled Apparatus Related to Accounting for the Consumption of Gas, Liquid and Electricity.

The invention is more particularly concerned with a method or process and apparatus arrangements which will avoid the necessity of making periodic visits to such consumer in order to effect reading of the meter at his premises or the collection of prepayment money or payments by the consumer.

It is already well known to supply a commodity, such as electricity or gas, on a prepayment basis and while the more usual form of prepayment metering apparatus is one requiring the insertion of actual coins therein in order to obtain an amount of commodity supply related to the value of the inserted coins, other proposals have been made which avoid the use of actual coins and hence the necessity of subsequent coin collection from the prepayment meter. These other prior art proposals include the use of tokens, such as special cards, plug-in switch units and mechanical actuator pieces, which need to be previously purchased from the supply authority and, when inserted in the special metering arrangements, allow the subsequent consumption through the latter of an amount of the commodity based upon the price paid for the token. While avoiding the need for coin collection from the meter at the consumer's premises and thus safeguarding against the loss or theft of monies due to the supply authority, such prepayment systems require meter constructions of relatively complex and expensive form and are, moreover, frequently undesirable or unattractive to certain classes of consumer, such as those requiring relatively large quantities of the commodity. The prepayment method is generally used by only a small minority of the total number of consumers of a supply network; with most consumers, supply on a credit or post-consumption payment basis has become standard practice but this has involved hitherto the necessity for effecting periodic visits to each of the consumer's premises to read the meter thereat and for an extensive account office organization thereafter to prepare and despatch appropriate bills calculated after scrutiny of the information collected by the meter reader and which necessarily vary in amount over a wide range in accordance with the different consumptions by each individual consumer.

In the aforesaid application there is disclosed apparatus in which an account is initiated or issued each time a meter registers consumption of a predetermined quantity of a commodity such as gas, liquid or electricity. The account may, for example, be one of a plurality of accounts already prepared and held inaccessible to the consumer and successively issued to a position which is accessible to the consumer in response to successive consumptions of the predetermined quantity of the commodity, so that each time the consumer's meter registers consumption of such quantity a further one of the accounts is issued to him. Each account thus corresponds to the predetermined quantity and, assuming a constant price, is for a constant cash amount. It is therefore possible to effect considerable simplifications of the accounting and billing mechanism and it is not necessary to print or otherwise provide any indication of a variable quantity or a variable cash amount on the accounts or bills as they are issued.

The initiation of an account or bill in response to each successive consumption of the predetermined quantity can also be used to great advantage by indicating each consumption of this quantity at an accounting post situated at a distance from the consumer's meter since it is not necessary to transmit the actual reading value of the register of the consumer's meter or any indication of a variable amount of consumption from the meter to the distant accounting post. Instead, all that is necessary is to indicate at the accounting post when, or whether or not, the particular consumer has consumed the predetermined amount. In its simplest form this requirement can be met in an extremely simple manner by the presence or absence of some signal which is capable of identifying the particular consumer from among the other consumers, presence of such signal indicating that he has completed consumption of the predetermined quantity and absence of such signal that he has not. In this way, it is possible to avoid entirely the difficulties and complications involved in transmitting, for instance at the ends of predetermined time intervals, information as to the variable amount of the commodity consumed during the immediately preceding time interval.

The particular value of the predetermined fixed amount of commodity consumption, hereinafter referred to as the "unit charging block," will vary according to the type of consumer. The value assigned to each consumer is such that, for normal usage, he will be billed not more than several times per month and no less than once over several months. For instance, in the case of electricity the unit charging block could be, say, 50 to 100 kilowatt-hours (kwh.) for small domestic type consumers or, say, 1000 kwh. for larger domestic consumers and, say, 50,000 or more kwh. fore commercial or industrial consumers. In practice, the various consumers connected to a common supply network would be divided into a number of different groups or classes according to the particular unit charging block value most suited to their average rates of consumption.

One object of the present invention is the provision of a new or improved process and system for metering and billing the consumption of a commodity such as electricity, gas, or liquid by an individual consumer connected along with a number of other consumers to a common supply network.

Another object of the present invention is to provide novel and improved apparatus for accounting for the consumption of a commodity from a supply network.

A further object of the present invention is to provide novel and improved apparatus for installation in or near a consumer's premises for emitting a signal each time the consumer is supplied with a predetermined amount of a commodity from a supply network.

Yet a further object of the present invention is to provide apparatus for installation in or near a consumer's premises for responding to an interrogation signal transmitted from a remote accounting post to indicate at the accounting post whether or not the consumer's meter has registered the predetermined quantity.

A still further object of the present invention is to provide apparatus for providing an accounting center with a separate indication of consumption of a predetermined amount of a commodity in response to each registration of the predetermined quantity by a meter through which the consumer is connected to a supply network.

Still another object of the present invention is to provide a metering arrangement for indicating at an accounting post at predetermined time intervals whether or not a consumer has consumed the predetermined quantity of a commodity from a supply network during the preceding time interval.

The above and other objects and features of my invention will be more readily apparent from the following descritpion of certain embodiments thereof taken in conjunction with the accompanying drawings, in which.

As shown in the drawings.

Figure 1:
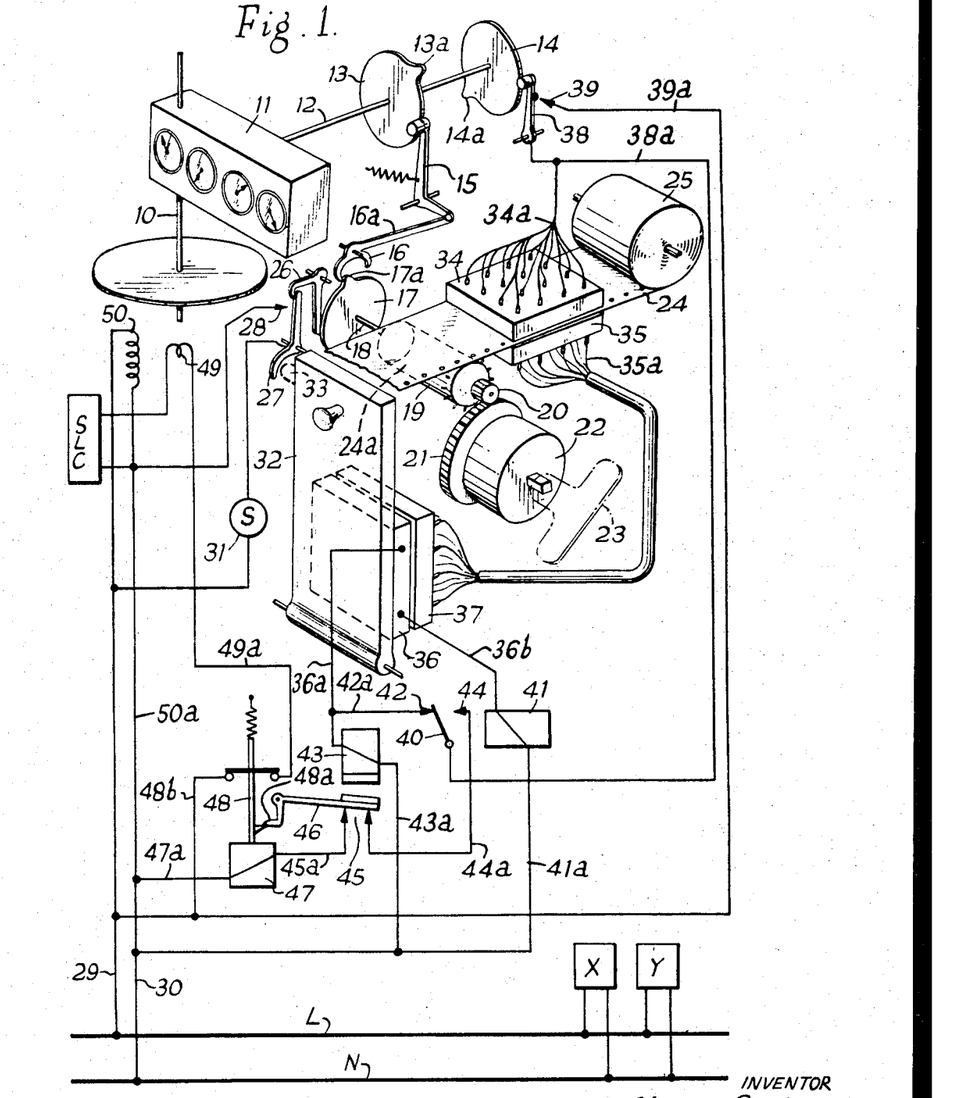
FIGURE 1 is a largely schematic diagram illustrating one form of electricity supply metering arrangement for a consumer and which provides for the issue of bills at the consumer's premises each for the amonut of the aforesaid "unit charging block"

Referring first to FIG. 1 of the drawings, this shows in largely diagrammatic form an embodiment of the invention as applied to the supply of electricity to a consumer from a commodity supply network which also has a number of other similar consumers connected in parallel thereto. By means of the arrangement as shown and about to be described, a bill is issued by the consumer's metering instrument and at the consumer's premises where such instrument is located each time the electricity consumption therethrough reaches the amount chosen as the unit charging block value for that consumer.

Such unit charging block amount is chosen so that with the normal average rate of consumption by the particular consumer, he will be issued with a bill at approximately the same intervals of time as would be the case if the conventional periodic meter reading and subsequent billing-by-post technique was employed. Thus, purely by way of illustrative example, if the average consumption by a particular consumer is 3 kwh. per day and the supplier wishes to render a bill about once every month, then the unit charging block value is chosen to be 100 kwh. Alternatively, if billing once every two weeks is considered to be more desirable, then the unit charging block value chosen for the consumer will be 50 kwh. If billing only once every quarter is required, then the unit charging block value would be set at 300 or 400 kwh.

In the said FIG. 1, reference numeral 10 indicates the conventional metering instrument spindle with its attached rotor disc for operating the register mechanism 11 which is shown as of the multiple dial type but which may obviously be of any other suitable form, such as the alternative cyclometer type. To an appropriate one of the spindles of this register mechanism 11, for instance, the spindle of the "tens of units" dial when a bill is to be issued for every 100 units of consumption, is attached an extension spindle 12 carrying cam discs 13 and 14. Cam disc 13 has a projection 13a operative to rock a bell crank lever 15 which is supported on fixed position pivots and is coupled to an extension arm 16a of an escapement pawl 16 co-operating with a tooth 17a of a disc 17 rigidly secured to a shaft 18 carrying fixed thereto a feed roller 19 and a pinion 20 in geared engagement with a gearwheel 21 forming the driven element of a spring drive unit 22 whose internal spiral spring is capable of being wound up by means of a manually operable key 23.

The roller 19 is conveniently provided with a number of radially projecting teeth to form a sprocket drive for a paper strip 24 drawn from a storage roll 25. This strip 24 is perforated transversely at suitable regular intervals to facilitate separation into separate bill-forming elements or sections 24a and the arrangement is such that a length of such strip 24 corresponding to one bill 24a is fed forwardly at each operation of the escapement mechanism 16, 17 by the cam disc 13 under the influence of the stored energy of the spring drive unit 22.

Figure 2:
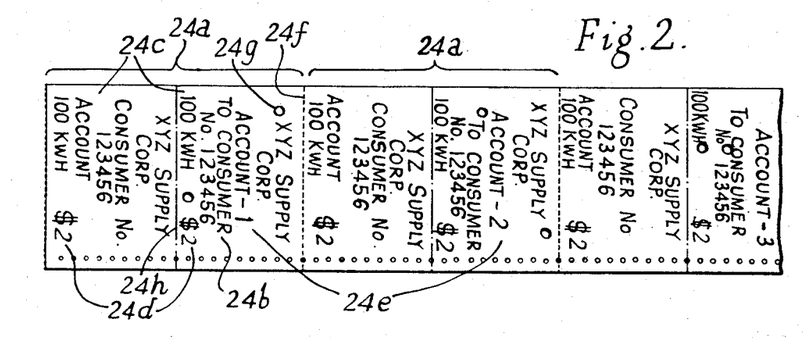
FIGURE 2 illustrates the form of the bills issued by the arrangement of FIG. 1.

As shown in FIG. 2, each bill section 24a may be appropriately pre-printed with suitable matter identifying the consumer, e.g. by a code number 24b or other like means, and with an indication 24c of the number of kwh. consumed, i.e. the amount of the unit charging block assigned to the particular consumer, the actual monetary charge 24d and other matter such as a serial number 24e to permit the supply recording or accounting center to check that each consecutive consumption block is paid for.

While, in the example shown, the bills are shown as being initially in continuous roll form, such bills may be of folded strip form similar to manifold stationery or in the form of separate sheets of paper or cards, the issuing arrangements being of appropriately modified form adapted to deliver one bill each time the register mechanism registers the chosen amount of consumption. Arrangements may also be provided for dating the bill as it is being issued.

Figure 4:
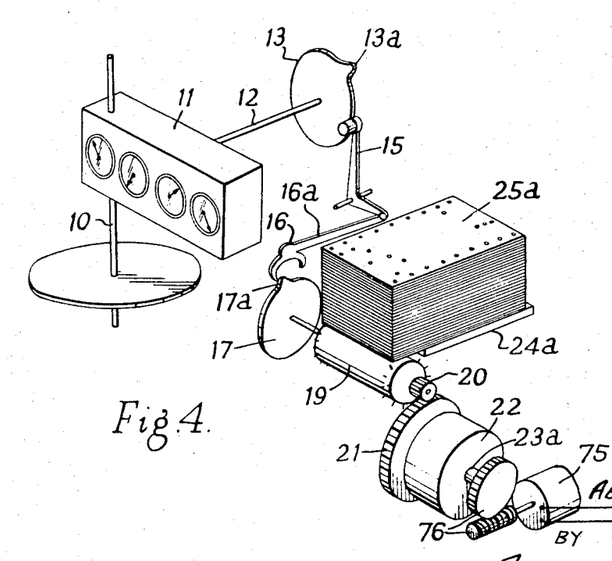
FIGURE 4 shows a schematic view of an alternative form of apparatus intended for installation in a position accessible to the consumer for issuing bills directly to the consumer.

FIGURE 4 illustrates one modification for use when separate sheets of paper or card are used for each bill. In this modification, the feed roller 19 is located beneath a vertical stack 25a of account cards 24a. The projecting teeth of the roller 19 engages perforations in the side edges of the lowermost card and operate to slide this from the bottom of the stack each time such feed roller 19 rotates under the control of the escapement mechanism 16, 17, 17a as already described in connection with FIG. 1.

As shown, the account cards 24a are in the form of a standard type punched card adapted for use directly with the usual forms of electro-mechanical business and accounting machinery located at the supply authority's accounting center.

Preferably, each issued bill 24a is arranged, as by the provision of a row of perforations, shown at 24f in FIG. 2, so that it can be divided into two parts, one of which can be receipted and returned to the consumer upon payment of the bill and the other, that which is of punched card form when this type is used, passed to the supply authority's recording and accounting center.

The arrangements so far described represent a simple embodiment of the present invention whereby every time the consumer's meter registers the consumption of the predetermined unit charging block of, say, 100 kwh., the bill issuing mechanism is operated and the appropriate bill is fed forwardly and released for collection by the consumer and subsequent payment by him.

More elaborate arrangements may be provided comprising, first, means for giving an audible or visual indication each time a bill is issued by th metering instrument or by an associated auxiliary device as described later. In the embodiment shown in FIG. 1, such means comprise a pivoted bell-crank latch lever 26, one limb of which is engaged and rocked by the tooth 17a each time the disc 17 rotates, thereby unlatching a rocking contact lever 27 which, when released, closes a circuit through contact 28 across the consumer's supply main input leads 29, 30 and through an alarm device 31, such as a bell, buzzer or lamp. Access to the issued bill is by way of opening movement of a hinged door 32, such door carrying an abutment 33 which operates upon the tail of the contact lever 27 to reset this behind the latch lever 26, thereby again opening the contacts 28 and cancelling the alarm.

Figure 3:
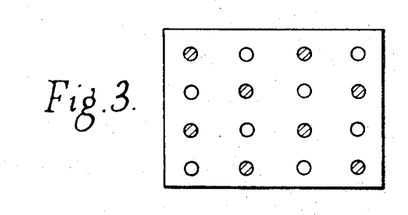
FIGURE 3 is a diagram illustrating in detail a part of the device of FIG. 1.

The embodiment shown also includes a further optional refinement in the form of means for promoting prompt settlement of each issued bill by automatic cut-off of the consumer's supply if the issued bill is not paid by the time a predetermined further amount of electricity has been consumed. These means comprise the pre-punching, as shown at 24g in FIG. 2 and according to a pattern predetermined by the supply authority, of that part of each bill 24a which is to be forwarded to the accounting center, each successive bill of the strip 24 having a different punching formation. At a position before the strip 24 passes the feed roller 19, it passes between a pair of co-operating contact blocks 34, 35 each carrying a plurality of contacts, preferably lightly spring loaded, each contact in one block being in alignment with its opposite number in the other block and serving to establish a connection with such opposite number whenever the intervening paper strip 24 has a punching in alignment therewith. A second, precisely similar, pair of contact blocks 36, 37 is provided with one block 36 secured to the door 32 and the other block 37 held stationary by mounting upon the main body of the device. Corresponding contacts of the blocks 35 and 37 are separately interconnected one with the other by way of individual conductors 35a while all of the contacts of the block 34 are connected in parallel to a common lead 34a. The contacts of the block 37 are connected into two groups A and B, conveniently arranged as shown in FIG. 3 where those shown shaded are connected in parallel to form one group, the A group, and those shown unshaded likewise connected in parallel to form the second group, the B group.

The second cam disc 14 on the extension spindle 12 has a projection 14a which co-operates with a rocking contact lever 38 to establish electrical connection between the lever and a fixed contact 39 once during each revolution of the spindle 12 and at an instant which is approximately coincident with the further consumption of half the chosen unit charging block value beyond that at which the bill issuing equipment was previously operated. Contact 39 is connected by conductor 39a to the consumer's mains lead 29 while the contact lever 38 is connected by way of lead 34a to all of the contacts of block 34 and by conductor 38a to the armature 40 of a relay 41. The off-normal contact 42 of this relay 41 is connected by way of conductor 42a to one side of an electro-magnet 43, the other side of which is connected to the other consumer's mains lead 30 by way of lead 43a while the normal contact 44 of such relay 41 is connected by way of conductor 44a, contacts 45 (normally bridged by the armature lever 46 of the magnet 43), conductor 45a, the operating coil of electrically operated resetting mechanism 47 for a strip switch and conductor 47a to the consumer's mains lead 30. The B group of contacts of the block 36 are connected in parallel and thence by way of lead 36a to the magnet 43 while the A group of contacts of such block are also connected in parallel and thence by way of lead 36b through the energizing coil of the relay 41 and conductor 41a to the consumer's mains lead 30. The trip switch 48, which is spring biased towards the open state but is normally held closed by a latch mechanism 48a connected to the armature lever 46 of the magnet 43, is connected by conductors 48b and 49a in series with the current coil 49 and lead SLC at the consumer's premises. The voltage coil of the consumer's metering instrument is indicated at 50.

In the operation of this further mechanism, each time a bill is issued by operation of the escapement 16, 17a, a new perforation pattern, that which is present in the next following bill yet to be issued, is brought between the contact blocks 34, 35. This sets up a new interconnection path between the contact lever 38 and the relay 41 by way of a different one of the A group of contacts and another new interconnection path from the same switch lever to the electromagnet 43 by a different one of the B group of contacts. In the event that the just-issued bill is not paid and appropriate action accordingly not taken by the consumer with his receipted half of the bill as explained later, before the time when a further consumption of about half of the chosen unit charging block value has been reached, projection 14a of cam disc 14 causes contact lever 38 to close with contact 39 thereby setting up an energizing circuit to the magnet 43 by way of the relay armature 40 and off-normal contact 42. The magnet 43 therefore attracts armature lever 46 to unlatch the trip switch 48 thus opening the consumer's current supply circuit and discontinuing his supply.

If, however, during the intervening period following the issue of the last bill, the consumer has presented this for payment, then this bill is divided into two halves as indicated by the dotted line 24h, FIG. 2, and before the receipt-forming half 24j, hitherto unpunched, is returned to the consumer, the receipting authority applies thereto a punching pattern which is related in a particular way to that of the part of the next following bill now lying between the contact blocks 34 and 35. This applied punching pattern is so chosen that it completes the circuit set up through the blocks 36 and 37 by way of the A group of contacts in the blocks but prevents completion of the circuit set up through such blocks by way of the B group of contacts in the blocks.

In consequence, if the consumer, having obtained his perforated receipt section, places this between the blocks 36 and 37 by opening the door 32, then at the following time when the one-half unit charging block value of further consumption is reached and contacts 38 and 39 close, a circuit is also completed through the contact blocks 34, 35 and the contact blocks 37, 36 to the appropriate A group contact of block 36 and so through the relay coil 41. Energization of this relay, which is made faster acting than that of the magnet 43, operates the armature 40 thereby to break the circuit through the off-normal contact 42. This prevents operation of the magnet 43 and prevents the tripping of the switch 48. The consumer's supply is therefore maintained uninterrupted. The further circuit from the armature 40 through the now-engaged contact 44 is for the purpose of energizing the reset mechanism 47 of the trip switch 48 in the event that the insertion of the receipt does not take place until after automatic opening of the consumer's circuit at the predetermined further consumption point has occurred.

The purpose of the B group of contacts and the associated circuit is to make it obligatory for the consumer to insert a receipt which not only allows the requisite clearing circuit to be set up by way of the A group of contacts, but also positively prevents a direct tripping circuit being established through the B group of contacts.

Other consumers, such as shown at X and Y, having similar metering arrangements may be connected to the same supply network although such consumers need not have the same unit charging block value.

Various modifications may obviously be made. For example, the bill-issuing equipment may be constructed as a separate and auxiliary device for location in a more convenient position than at the supply metering instrument. With such a modification, all of the parts shown except the meter components and cam disc 13, 14 with their associated levers may form part of the auxiliary device in which the escapement pawl 16 is operated by an electromagnet, the energising circuit of which is closed by contacts associated with the lever arm 15.

Instead of having the spring drive unit 22 arranged for manual winding as in FIG. 1, such drive unit may be kept continuously wound by means of a small synchronous or other electric motor as indicated at 75 in FIG. 4, said motor operating upon the winding spindle 23a of the drive unit through a reduction gear system 76.

Figure 5:
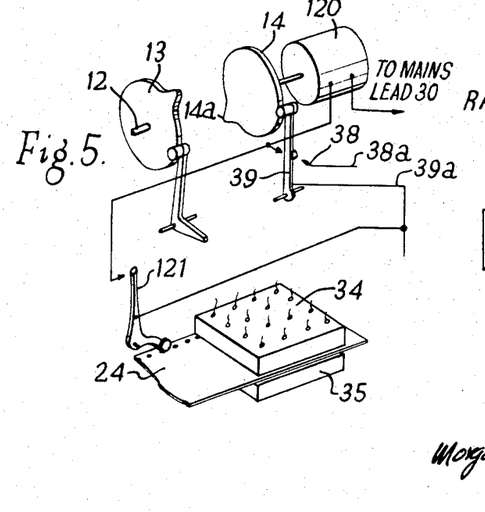
FIGURE 5 shows a schematic view of a modification of the arrangement shown in FIG. 1.

FIG. 5 shows a further modification of the arrangement shown in FIG. 1 for effecting cut-off of supply on a timing basis following the issuing of a bill in the event of its non-payment. As shown in FIG. 5, the cam disc 14 is removed from the spindle 12 and secured to the output shaft of the time switch 120 arranged to be energized each time a bill is issued by means of a bill sensing switch 121 which is tripped into closed position following each bill issuing operation.

If desired, the trip switch 48 may be arranged to be capable of being reset only by an officer of this supply organization for which service an additional fee may be payable. A variety of arrangements other than that shown and described above may be provided for cutting off the consumer's supply in the event that the bill for the previous unit charging block has not been paid.

While the above embodiment of the invention is concerned with accounting for the supply of electricity, it will be clear that the invention is equally applicable to the supply of other commodities such as gas or liquids.

Figure 6:
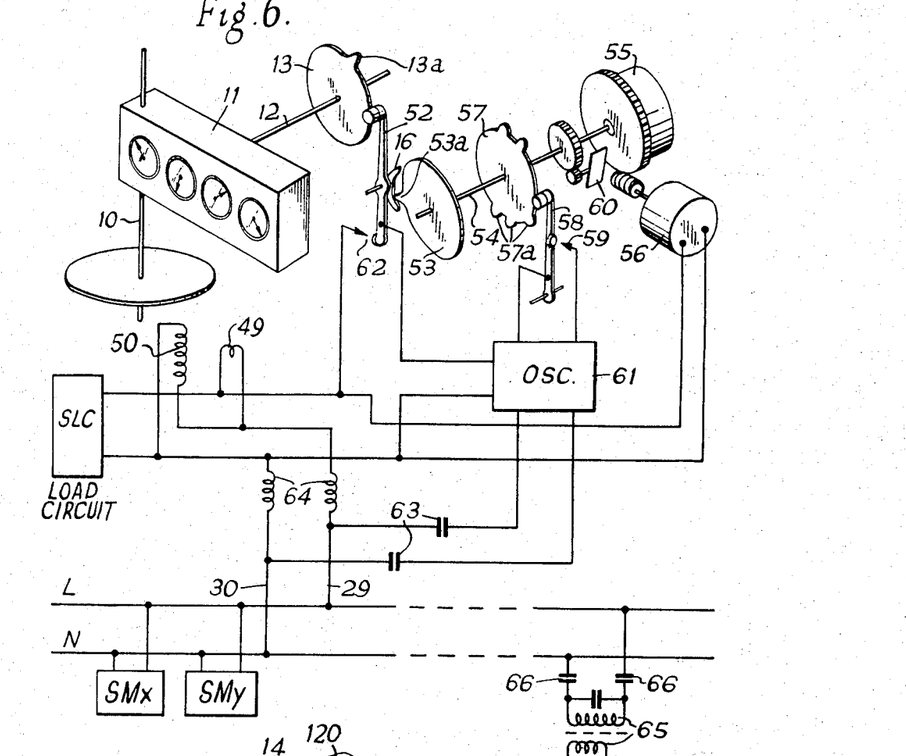
FIGURE 6 is a schematic diagram illustrating one form of an electricity supply metering and accounting arrangement according to the present invention for transmitting a signal from a consumer's premises to an accounting center each time a predetermined number of kwh. or a unit charging block amount has been consumed.

FIG. 6 shows a different arrangement in the form of a metering arrangement in which the spindle 10 of a conventional kwh. meter operates a register mechanism 11, which is shown as of the multiple dial type but which may of course be of any other suitable form, such as the alternative cyclometer type. To an appropriate one of the spindles of this register mechanism 11, for example, the spindle of the "tens of units" dial where a bill is to be initiated for every one hundred units of consumption, there is attached an extension spindle 12 carrying a cam disc 13.

The cam disc 13 is formed with a projection 13a operative to rock a lever 52 carrying an escapement pawl 16 co-operating with tooth 53a of a disc 53 attached to a shaft 54 which is coupled to the driven or output element of a storage spring drive unit 55. This unit 55 is arranged to be continuously wound-up at an appropriate slow speed by means of a small electric motor 56.

The spindle 54 also has secured thereto a cam disc 57 having one or more projections 57a which co-operate with the follower roller of a rocking contact lever arm 58 which engages fixed contact 59 when moved outwardly by any one of the projections 57a. To maintain a predetermined speed of rotation of the spring-urged spindle 54 when released by the escapement pawl 16, governing means such as an air brake 60 may be coupled thereto.

The contacts 58, 59 are arranged in the keying circuit of an oscillator 61, operating at a suitable frequency, say, of the order of 2 to 5 kc./s. The input power for this oscillator is preferably derived from supply mains L, N (to which the consumer's metering instrument and his load circuit SLC are connected) by way of contacts 62 at the lower end of the lever arm 52. The alternating current signal output of the oscillator 61 is connected by way of blocking condensers 63 to the consumer's input mains leads 29, 30. Preferably, the consumer's input leads include choke coils 64 resonant at the frequency of the oscillator 61 in series therewith as shown.

Other similar consumer metering arrangements are connected to the same network busbars L, N and are indicated at SMx, SMy.

At a remote accounting center RAC connected to the same supply network and constituting a common recording point or post, there is provided a resonant circuit 65 coupled across the networks, L, N by way of blocking capacitors 66 and feeding to the input of an amplifier A whose output is applied to a suitable demodulator circuit D to operate means such as a punched tape or other type of signal recorder 67 and/or to provide input signals to an electronic computing device or data handling equipment 68 of any suitable form.

In the operation of this embodiment, at each revolution of the tens of units spindle 12 of the consumer's metering instrument, i.e. once every 100 kwh. of consumption, the projection 13a on the cam disc 13 rocks the escapement pawl 16 thereby to release the spindle 54 to make one complete revolution by power from the drive unit 55. During such revolution the various projections 57a on the disc 57 operate the switch contacts 58, 59 to key the oscillator 61 on and off and thereby to provide a pulsed form signal, for instance, a binary number signal identifying the consumer and determined by the number and positioning of the projections 57a. This signal, as bursts of oscillations at the frequency of the oscillator 61, is fed to the network conductors L, N and transmitted thereover to the remote accounting center RAC where such signals are selected by the resonant circuit 65 and are amplified to produce corresponding electric pulses which then operate to produce a punched tape or other form of record in the recorder 67 and/or serve as an input signal to the computing device 68.

In order to avoid continuous energization of the oscillator 61 during the relatively very long periods when its use is not required, the power input circuit thereto is arranged as shown to be closed at contacts 62 only when the lever arm 52 is rocked to release the spindle 54 for each single revolution, and the shape of the projection 13a may be modified to ensure that the contacts 62 remain closed until the projection 53a is again engaged by the pawl 16.

At the remote accounting center, the transmitted signal, made of unique form for identifying the particular consumer by appropriate shaping and/or positioning of the contacts 57a on the disc 57, provides a record that that particular consumer has again registered consumption of his predetermined unit charging block value. From this information an appropriate bill can be prepared and despatched, e.g. by post, to the consumer. Alternatively such identifying pulse signal can be applied as an input signal to the computer 68 which is programmed appropriately to perform automatically the required data recording and bill preparing and issuing operations. The other similar consumers such as SMx, SMy connected to the same supply networks, L, N have metering instruments with similar apparatus arranged to provide for the issue of appropriate different identifying signals when they each register further consumption of the respective predetermined unit charging block amounts, such signals being also passed to the common recording and accounting center to be recorded and/or to initiate operation of the computer or other means.

Figure 7:
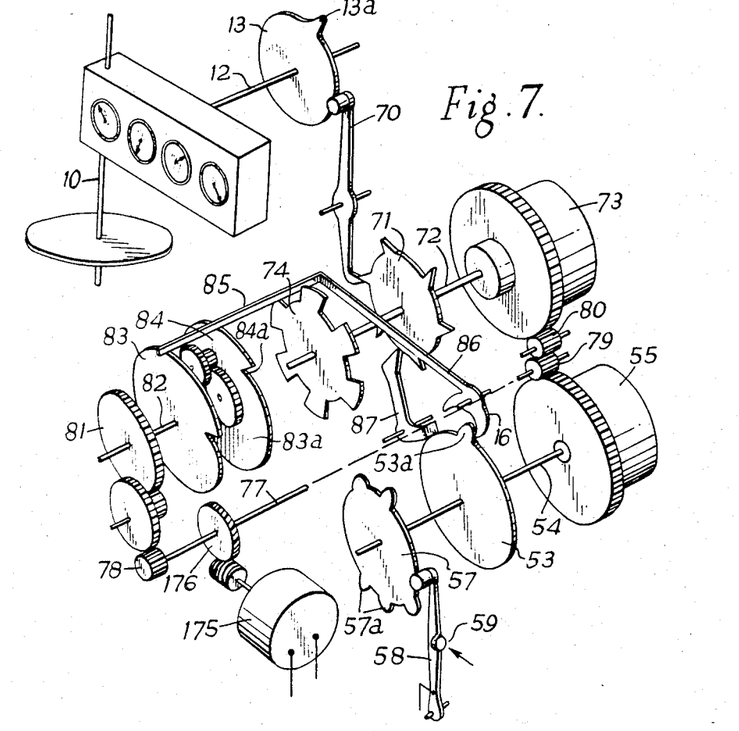
FIGURE 7 is a schematic view similar to FIG. 6 but showing an electricity supply metering and accounting arrangeemnt by which a signal can be sent at the end of a predetermined time interval to an accounting post to indicate at such post whether the consumer has completed consumption of the predetermined number of kwh. or unit charging block during the preceding time interval.

In order to reduce the risk of simultaneous or overlapping signals being emitted by the different metering instruments belonging to the various individual consumers, means may be provided for establishing the required signalling channel to the common recording and accounting center for only a short period at predetermined time intervals, for instance, during a particular five minute interval of each successive week, the different consumers' metering instruments being arranged to have different access time during such week. One arrangement of this nature, forming a modification of FIG. 6, is illustrated in FIG. 7 where the extension spindle 12 again carries the cam disc 13 having a projection 13a thereon. This cam projection is now made operative upon a rocking latch lever 70 whose opposite toothed end normally engages with and arrests a multi-toothed star wheel 71 rigidly secured to a spindle 72 which is arranged to be driven, when released, by a storage spring drive unit 73. This spindle 72 carries a further notched disc 74 comprising alternate tooth and gap regions equal in number to the number of teeth on the star wheel 71. A small synchronous electric motor 175, continuously energized from the consumer's supply input leads 29, 30 (see FIG. 6), drives through a reduction gear 176 to a shaft 77 which carries two pinions 78, 79 fixed thereon. The pinion 79 is in meshing engagement with a further pinion 80 so as continuously to wind up the spring drive unit 73 and is also coupled so as continuously to wind up the spring drive unit 55. The other pinion 78 is connected through an appropriate large ratio reduction gear train 81 to a spindle 82 which rotates at the rate of one revolution per day and carries thereon a cam disc 83 having a single notch 83a therein. This same spindle 82 is connected through a 7:1 ratio gear train to a further disc 84 having a single notch 84a therein whereby such further disc 84 rotates at the rate of one revolution per week. A cam feeler bar 85 rests upon the peripheral surfaces of the three discs 74, 83 and 84 and is coupled by means of a lever arm 86 to the escapement pawl 16 which controls the release of the projection 53a of the disc 53 secured to the spindle 54 carrying the signal control cam disc 57 as in FIG. 6. The periphery of the cam disc 53 is also engaged by one arm of a pawl lever 87 whose opposite end operates as a stop for the teeth of the star wheel 71 at a position approximately midway between those at which it is held by engagement of successive teeth with the latching lever 70.

In the operation of this modified arrangement, each time the consumer's metering instrument records the predetermined unit charging block of electricity consumption, the latching lever 70 is rocked by the cam projection 13a and releases the star wheel 71 which is rotated by the spring drive unit 73 until it is again arrested by engagement of a tooth thereof with the pawl lever 87. This movement causes rotation of the notched disc 74 to present a gap thereof instead of a tooth beneath the feeler bar 85. Simultaneously the discs 83 and 84 are continuously rotating but by virtue of their form and intergearing, the respective single notches 83a and 84a therein will jointly be in alignment with the feeler bar 85 only once during each seven day or week period. When this alignment occurs after the notched disc 74 has been moved, the feeler bar 85 is free to drop. This movement of the feeler bar operates the escapment pawl 16 and releases the spindle 54, so that whenever, during the preceding one-week period, the consumer's meter has recorded consumption of the predetermined unit charging block amount, the required signal is transmitted to the remote recording and accounting center during the unique time period allocated to that particular consumer. The rotation of the cam disc 53 causes movement of the latching pawl 87 as it nears the end of its one revolution. This permits the spindle 72 to rotate further but only to a limited extent determined by the location of the feeler bar 85 in front of one of the projecting teeth of the disc 74. At a later instant when the one-day disc 83 has rotated sufficiently, the feeler bar 85 is itself lifted by the sloping side of the notch 83a to release the notched disc 74 and spindle 72 which now rotates still further until the next tooth of the star wheel 71 engages under the end of the now-restored latch lever 70.

In another alternative arrangement, more particularly suitable for cases where only a relatively small number of consumers are connected to a given supply network, identification of each consumer may be by the particular oscillation frequency of the signal emitted by the oscillator 61 (FIG. 6) which in this case may be a simple single pulse rather than a complex identification pulse signal train. Thus, referring to FIG. 6, the oscillator 61 may be controlled only as to its power supply by means of contacts 62 and the pulsing contacts 58, 59 with the associated cam mechanism omitted. The oscillator 71 at one consumer's meter is then arranged to operate at one chosen frequency $f1$ whereas the oscillators at the other consumers' meters operate at respectively different and chosen frequencies $f2$, $f3$ . . . etc. The demodulator means D is then any suitable known form of frequency analyser, preferably one arranged for continuous sweeping over the range of frequencies $f1, f2$ . . . used.

In yet another alternative arrangement, instead of actually emitting a signal from or under the control of each consumer's metering instrument, the latter may be arranged to connect some form of frequency sensitive circuit resonant at a frequency unique to each consumer, for instance, a series acceptor circuit, to the conductors by which the required metering signal is to be conveyed whereby, at periodic intervals of, say, once per week, means at the common recording and accounting center can be operated to test the network or other signal conductors employed for the presence or absence of connection of each of the different frequency sensitive circuits to the remote consumer points of the supply network and according to the measured response obtained at each of the different test frequencies, can determine whether or not each consumer concerned has in the meantime registered the particular unit charging block value of consumption appropriate to such consumer.

Figure 8:
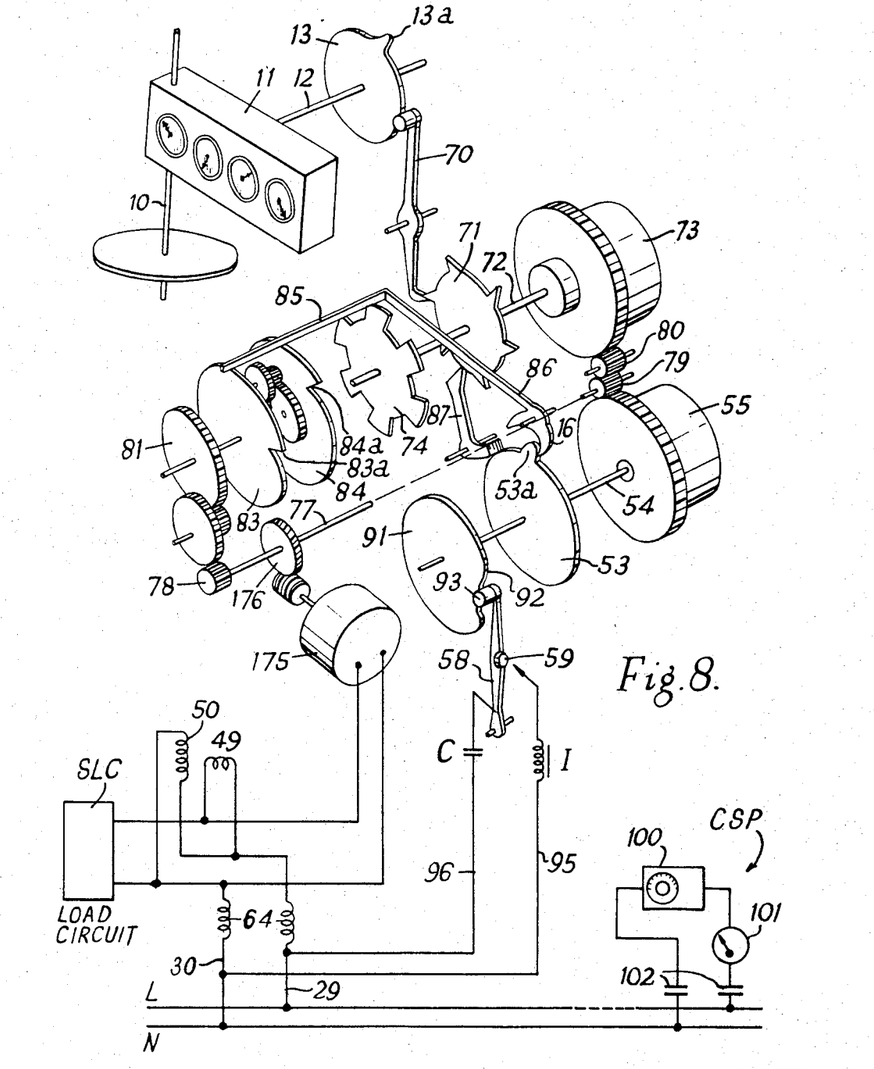
FIGURE 8 shows a schematic view of a metering arrangement similar to that of FIG. 7 but which enables the accounting post to transmit an interrogating signal at the end of predetermined time intervals to determine whether the consumer has completed consumption of the predetermined amount during the preceding interval.

Such an arrangement is illustrated in FIG. 8 in which parts similar to those in FIG. 7 have been indicated by the same reference numerals. In this modification, the cam disc 57 of FIG. 7 is replaced by a cam disc 91 which is of constant radius except for a recess 92. On rotation of the spindle 54 after registration of the predetermined unit charging block of consumption by the consumer's meter as already described with reference to FIG. 7, a cam roller 93 on the lever arm 58 is raised to the outer region of the periphery of the cam 91, causing the lever arm 58 to rock and so close the contacts 59. This closure connects a capacitance C and an inductance I in series across the consumer's main input leads 29, 30 through conductors 95, 96. The capacitance C and inductance I form the above-mentioned series acceptor circuit, which is tuned to have a maximum response at a chosen signal frequency $fa$.

Thus, each time the register mechanism of the consumer's meter registers consumption of the predetermined amount, the series acceptor circuit CI is connected across the consumer's main input leads and the common supervision post is able to detect such connection by sending a signal of frequency $fa$ along the supply lines L and N. It is, of course, to be understood that the leads 95, 96 may be connected to a separate signal conductor network instead of the main current supply input leads 29, 30 and that a plurality of consumers having similar series acceptor circuits resonant at suitable different frequencies *fb, fc, fd* . . . etc. respectively, can be connected by the network to the common supervision post so that, by sending out signals of these frequencies and measuring the signal current, the common supervision post can find which of the consumers have consumed their respective predetermined supply amounts.

To determine whether the series acceptor circuit is connected across the supply lines, the common supervision post CSP is provided with a variable frequency oscillator 100 for selectively transmitting signals of frequency *fa, fb, fc* . . . etc. to the supply lines L, N by way of an ammeter 101 and series capacitors 102. Thus, by setting the oscillator to the frequency *fa* and noting the reading on the ammeter 101 the common supervision post is able to determine by the value of the current flow whether the consumer whose series acceptor circuit is tuned to frequency *fa* has consumed the supply amount predetermined for him.

A further means of preventing confusion and easing the total number of different distinctive signal characteristics necessary to identify separately each of the consumers connected to the supply network resides in the subdivision, as by the insertion of suitable metering signal blocking means, of the total supply network into a number of separate sections. By then providing each section with means for sensing the various consumers' metering instruments on that section and transmitting the results obtained to the common recording and accounting center by means of a special signal channel, each characteristic form of consumer identification may be used several times, once in each different isolated section of the supply network. Such isolation is conveniently effected at the various local distribution points, such as transformer substations or the like.

Figure 9:
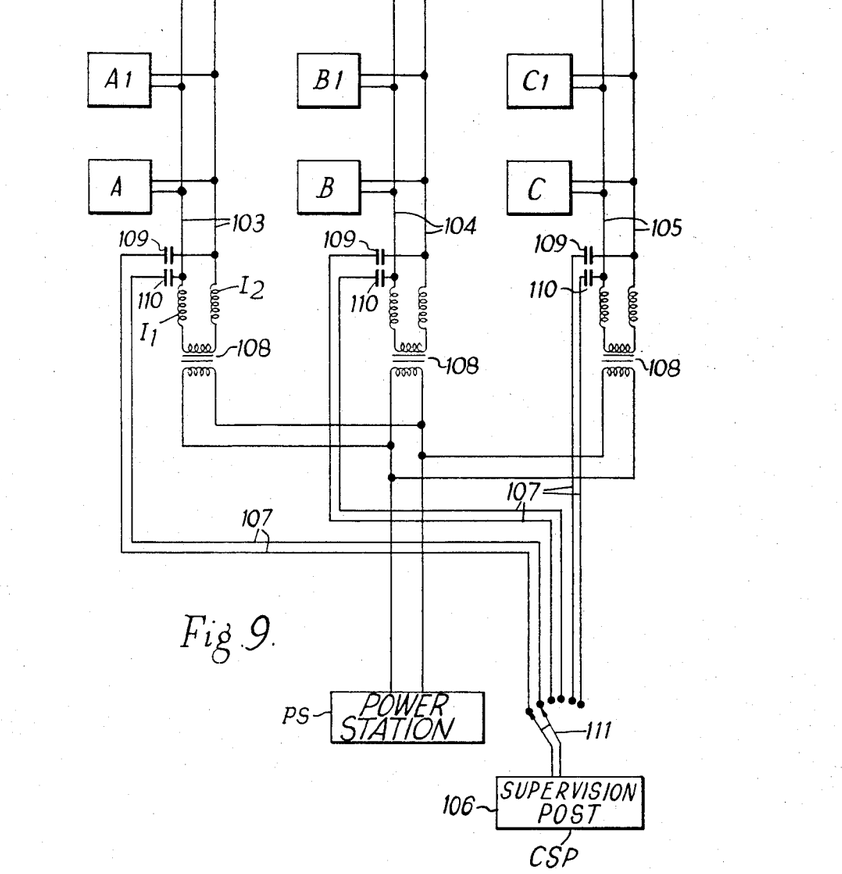
FIGURE 9 illustrates diagrammatically a communication linkage arrangement for use with the arrangements of FIGS. 6, 7 and 8 to enable the same signal to identify more than one consumer.

This arrangement is diagrammatically illustrated in FIG. 9, which shows three groups of consumers A, A1 . . . , B, B1 . . . and C, C1 . . . connected respectively to supply line sections 103, 104 and 105 fed from a common power station PS through substation transformers 108. Each supply section 103, 104, 105 is connected by way of individual pairs of signal conductors 107 to the common supervision post CSP. Each signal conductor pair 107 is isolated from the supply lines by means of isolating condensers 109, 110 while inductances I1, I2 are preferably connected in series with the supply lines between the signal conductors and the substation transformers 108 and are arranged to have a high impedance in the frequency range of the signals sent along the signal lines as described below.

It will thus be seen that the network is divided into three similar sections, one including consumers A, A1 . . . , another including consumers B, B1 . . . , and the third including consumers C, C1 . . . . It will of course be understood that each section would in practice include many more than two consumers. Each section is connected by the separate signal conductors 107 to the common supervision post, which can thus use a frequency *f1* to identify consumers A, B and C and a different frequency *f2* to identify consumers A1, B1 and C1 and can distinguish between consumers A, B and C or A1, B1 and C1 by noting which of the pairs of signal lines is connected by switch 111 to the common supervision post.

To avoid confusion, it will be necessary to ensure that the frequency used to identify any one consumer in a section, or in the case of the arrangement described with reference to FIG. 8 in a network, is not a harmonic or multiple of that used to identify another consumer in the same section or network.

While the arrangements of the invention as described above are more particularly suitable for use with existing forms of distribution networks with supply conductors as at present installed, the invention visualizes the possible incorporation within future supply networks of one or more special meter record transmission conductors to which connection is made along with the normal supply connected at each consumer's premises, said special record transmission conductor being then used as the signalling channel between the various consumers' premises and the remote common recording and accounting center instead of the supply conductors themselves thereby to avoid many of the difficulties which may otherwise arise due to variation of the load characteristics of the network at different times and/or the presence of spurious signals due to switching surges and the like. It is possible, of course, to use an entirely separate signal channel such as a telephone line between the consumer's premises and the remote recording and accounting center and by appropriate choice of the form of the identification signals used, such signals may be superimposed upon the normal speech transmission circuits without in any way interfering with the normal usage of the latter.

Figure 10:
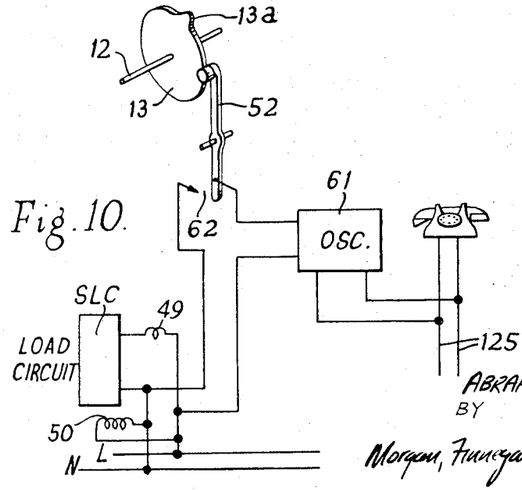
FIGURE 10 shows an arrangement for indicating consumption of a commodity by transmitting signals over a telephone line.

Thus, referring to FIG. 6, FIG. 7 or FIG. 8, instead of connecting the output of the oscillator 61 or the resonant circuit CI across the power supply lines L, N, such oscillator output or resonant circuit may be connected to a separate pair of record transmission conductors as shown at 125 in FIG. 10. Such conductors 125 may be, as stated above, installed along with the supply cable network or they may be for example a telephone line provided for normal use at the consumer's premises.

The above-described signalling of each consumption by a consumer of his particular unit charging block amount to a common recording center can be employed in addition to the actual bill issuing arrangements of FIGS. 1–3, 4 or 5 for use as a check by the supplier and/or for automatic recording for statistical or other purposes.

The manner of storage of the prepared bills and the position of their presentation at the instant of delivery may be varied as thought most appropriate. For example, delivery may be in a vertical or an inclined plane instead of horizontal while in the case where the bills are of card or sheet form these may be stored in either a vertical or an inclined plane.

While I have illustrated my invention in certain preferred forms, I do not intend to be limited to such forms, except insofar as the appended claims are so limited, since modifications coming within the scope and spirit of my invention will be readily suggested to others with my disclosure before them.

I claim:

1. A commodity metering and billing system, comprising:
    a metering device at the customer location coupled to the commodity supply and operative to measure consumption of electric power and like commodities;
    a register connected to said metering device and operative to provide a bill-issuing actuation each time the total commodity consumption reaches a predetermined fixed amount at least equalling the amount normally used at such location during a period of at least one week;
    a bill-issuing means including
        means for issuing independent finalized customer bills with each successive customer bill being for an identical predetermined amount, and
        means for initiating issuance of said independent customer bill for said identical predetermined amount upon each actuation of said bill-issuing means; and
    coupling means for coupling said register to actuate said bill-issuing means in response to each of said bill-issuing actuations.

2. The system according to claim 1 wherein said bill-issuing device is at the customer location.

3. The system according to claim 1 wherein said bill-issuing device is located remote from the customer location.

4. The system according to claim 1 wherein said register is preset to provide, for normal usage, a bill-issuing actuation not more than several times per month and no less than once over several months.

5. In a system according to claim 1 further comprising shut-off means coupled to said commodity supply and operative to shut off said supply in the event that an indicia is not received indicating payment within a predetermined period after a bill-issuing actuation.

6. In a system accordng to claim 1 wherein said metering device is an electric power meter.

7. A commodity metering and billing system, comprising:
    a metering device at the customer location coupled to the commodity supply and operative to measure commodity consumption;
    a register connected to said metering device and operative to provide a bill-issuing actuation each time the total commodity consumption reaches a predetermined fixed amount at least equalling the amount normally used at such location during a period of at least one week;
    a bill-issuing means at the customer location for issuing independent finalized customer bills with each successive customer bill
        identifying the customer, and
        being for an identical predetermined amount;
    actuating means coupled to said bill-issuing means and operative, upon actuation, to initiate issuance of a fiinalized customer bill; and
    coupling means for coupling said register to said actuating means to initiate issuance of a finalized customer bill in response to each of said bill-issuing actuations.

8. The system according to claim 7 further including an alarm device connectetd to provide an indicia to the customer indicating issuance of a finalized customer bill.

9. The system according to claim 7 wherein said bill-issuing means issues independent customer bills each including two parts, each part identifying the customer and the predetermined amount.

10. The system according to claim 7 wherein said customer bills are on a roll and wherein said bill-issuing means issues successive customer bills from said roll.

11. The system according to claim 7 wherein said customer bills are in the form of separate cards and wherein said bill-issuing means issues successive customer bills in the form of cards.

12. The system according to claim 7 wherein said customer bills have holes punched therein according to a predetermined code and wherein said bill-issuing means issues successive customer bills codes with holes punched therein.

13. A commodity metering and billing system connected to a supply network simultaneously serving a plurality of customer sites, comprising:
    a metering device at each customer site coupled to said supply network and operative to measure commodity consumption;
    a register connected to each of said metering devices to provide a bill-issuing actuation each time the total commodity consumption at the associated customer site reaches a predetermined fixed amount at least equalling the amount normally used during a period of at least one week;
    a bill-issuing means located at each customer site for issuing independent finalized customer bills when actuated, each successive customer bill for the same site being for the same identical amount;
    and coupling means for coupling each register to actuate the associated bill-issuing means in response to each of said bill-issuing actuations.

14. The system according to claim 13 wherein said registers at different customer sites can be preset to provide a bill-issuing actuation in response to total commodity consumptions of different amounts and wherein said bill-issuing means issues bills bearing amounts corresponding to the total commodity consumption which creates a bill-issuing actuation of the associated one of said registers.

15. A commodity metering and billing system coupled to a supply network simultaneously servicing a plurality of customer sites and operating through a remote accounting center, comprising:
    a metering device at each customer site coupled to the supply network and operative to measure commodity consumption;
    a register coupled to each of said metering devices to provide a billing actuation each time the total commodity consumption at the associated customer site reaches a predetermined fixed amount at least equal to the amount normally used during a period of at least one week;
    billing means located at the accounting center for initiating issuance of independent finalized customer bills, each successive customer bill for a particular customer site being for an identical predetermined amount corresponding to said total commodity consumption which creates said billing actuation for said particular customer site; and
    transmitter-receiver means for coupling each of said registers to said billing means so that issuance of a customer bill is initiated in response to each billing actuation.

16. The system according to claim 15 wherein each of said transmitter-receiver means includes a transmitter at each customer site for providing a pulse train identifying the customer site when actuatetd by a billing indication from the associated register.

17. The system according to claim 15 wherein each of said transmitter-receiver means includes a transmitter tuned to a different oscillating frequency.

18. The system according to claim 15 wherein the individual ones of said transmitter-receiver means are operative during different time intervals.

19. The system according to claim 15 wherein each of said transmitter-receiver means includes a resonant receiver circuit at each customer site tuned to a different frequency and activated in response to a billing actuation.

20. The system according to claim 15 wherein said customer sites are divided into isolated subsections.

21. The system according to claim 15 wherein said transmitter-receiver means operates via an electrical supply network.

22. The system according to claim 15 wherein said transmitter-receiver means operates via a communication line separate from said supply network.

References Cited

UNITED STATES PATENTS

| | | |
|---|---|---|
| 924,158 | 6/1909 | Gallagher. |
| 3,067,941 | 12/1962 | Marlot. |

FOREIGN PATENTS

| | | |
|---|---|---|
| 470,470 | 8/1937 | Great Britain. |

RUDOLPH V. ROLINEC, *Primary Examiner.*

GERARD R. STRECKER, *Assistant Examiner.*

U.S. Cl. X.R.

235—132, 151.21; 222—30; 346—28; 324—113